United States Patent
Stelzer (10) Patent No.: US 12,466,167 B2
(45) Date of Patent: Nov. 11, 2025

(54) CONTROLLABLE OPTICAL PROPERTIES AND MULTIPLE INDEPENDENT SWITCHING REGIONS

(71) Applicant: SAINT-GOBAIN GLASS FRANCE, Courbevoie (FR)

(72) Inventor: Richard Stelzer, Düsseldorf (DE)

(73) Assignee: SAINT-GOBAIN SEKURIT FRANCE, Thourotte (FR)

(*) Notice: Subject to any disclaimer, the term of this patent is extended or adjusted under 35 U.S.C. 154(b) by 223 days.

(21) Appl. No.: 18/263,855

(22) PCT Filed: Mar. 2, 2022

(86) PCT No.: PCT/EP2022/055256
§ 371 (c)(1),
(2) Date: Aug. 1, 2023

(87) PCT Pub. No.: WO2022/223187
PCT Pub. Date: Oct. 27, 2022

(65) Prior Publication Data
US 2024/0116276 A1   Apr. 11, 2024

(30) Foreign Application Priority Data
Apr. 19, 2021   (EP) .................................... 21169057

(51) Int. Cl.
*B32B 17/10*   (2006.01)
*G02F 1/155*   (2006.01)
*G02F 1/163*   (2006.01)

(52) U.S. Cl.
CPC .. *B32B 17/10504* (2013.01); *B32B 17/10036* (2013.01); *B32B 17/10513* (2013.01);
(Continued)

(58) Field of Classification Search
CPC ........ B32B 17/10504; B32B 17/10036; B32B 17/10513; B32B 17/10532;
(Continued)

(56) References Cited

U.S. PATENT DOCUMENTS

2009/0323160 A1   12/2009   Egerton et al.
2012/0026573 A1   2/2012   Collins et al.
(Continued)

FOREIGN PATENT DOCUMENTS

CN   103987909 A   8/2014
CN   109496277 A   3/2019
(Continued)

OTHER PUBLICATIONS

International Search Report as issued in International Patent Application No. PCT/EP2022/055256, dated Apr. 11, 2022.
(Continued)

*Primary Examiner* — Mariam Qureshi
(74) *Attorney, Agent, or Firm* — Pillsbury Winthrop Shaw Pittman LLP (57) ABSTRACT

A glazing unit having electrically controllable optical properties and multiple independent switching regions includes a composite pane with an electrically controllable functional element and a control unit to control the optical properties of the functional element. The functional element has an active layer having electrically controllable optical properties between a first flat electrode and a second flat electrode. The first flat electrode is divided by at least one insulation line into at least two separate electrode segments, wherein an electric voltage is applicable between each electrode segment of the first flat electrode and the second flat electrode independently of one another in order to control the optical properties of the section of the active layer situated therebetween. The second flat electrode is not segmented or is
(Continued)

segmented to a lesser extent than the first flat electrode. The control unit is adapted to ascertain the temperature of the composite pane.

16 Claims, 4 Drawing Sheets

(52) U.S. Cl.
CPC ........ *B32B 17/10532* (2013.01); *G02F 1/155* (2013.01); *G02F 1/163* (2013.01); *B32B 2605/00* (2013.01); *G02F 2203/01* (2013.01)

(58) Field of Classification Search
CPC ............ B32B 2605/00; B32B 2250/40; B32B 2307/202; B32B 17/10192; B32B 2255/10; B32B 2255/20; B32B 2255/205; B32B 17/10211; B32B 17/1022; B32B 2307/4023; B32B 2307/41; B32B 2307/414; B32B 3/02; B32B 3/08; B32B 17/10302; B32B 27/08; B32B 2307/4026; B32B 2307/412; B32B 2605/08; B32B 17/1011; B32B 17/10348; B32B 17/10761; B32B 17/1077; B32B 17/10788; B32B 27/30; B32B 27/306; B32B 27/36; B32B 27/40; B32B 7/12; G02F 1/155; G02F 1/163; G02F 2203/01
See application file for complete search history.

(56) References Cited

U.S. PATENT DOCUMENTS

| | | | |
|---|---|---|---|
| 2014/0300945 | A1 | 10/2014 | Parker |
| 2016/0026061 | A1* | 1/2016 | O'Keeffe ............ G02F 1/13394 |
| | | | 359/296 |
| 2020/0061974 | A1* | 2/2020 | Dröge ............... B32B 17/10302 |

FOREIGN PATENT DOCUMENTS

| | | | |
|---|---|---|---|
| CN | 111386194 A | 7/2020 | |
| DE | 100 43 141 A1 | 3/2002 | |
| DE | 10 2005 007427 A1 | 8/2006 | |
| DE | 10 2005 049081 B3 | 6/2007 | |
| DE | 10 2007 027296 A1 | 12/2008 | |
| DE | 10 2008 026339 A1 | 12/2009 | |
| DE | 10 2013 001334 A1 | 7/2014 | |
| EP | 0 876 608 B1 | 4/2002 | |
| EP | 1 862 849 A1 | 12/2007 | |
| EP | 3 456 913 A1 | 3/2019 | |
| WO | WO 2010/147494 A1 | 12/2010 | |
| WO | WO 2011/033313 A1 | 3/2011 | |
| WO | WO 2012/007334 A1 | 1/2012 | |
| WO | WO 2014/072137 A1 | 5/2014 | |
| WO | WO 2017/157626 A1 | 9/2017 | |
| WO | WO-2019011891 A1 * | 1/2019 | ............. G02F 1/166 |
| WO | WO 2021/057943 A1 | 4/2021 | |

OTHER PUBLICATIONS

GR First Office Action as issued in Chinese Patent Application No. 202280000950.7, dated Aug. 2, 2025.

* cited by examiner

CONTROLLABLE OPTICAL PROPERTIES AND MULTIPLE INDEPENDENT SWITCHING REGIONS

CROSS-REFERENCE TO RELATED APPLICATIONS

This application is the U.S. National Stage of PCT/EP2022/055256, filed Mar. 2, 2022, which in turn claims priority to European patent application number 21169057.3 filed Apr. 19, 2021. The content of these applications are incorporated herein by reference in their entireties.

The invention relates to a glazing unit with electrically controllable optical properties, its use, and a method for its control.

Glazing units with electrically controllable optical properties are known per se. They comprise composite panes equipped with functional elements whose optical properties can be changed by an applied electric voltage. The application of the electric voltage is done via a control unit that is connected to two flat electrodes of the functional element between which the active layer of the functional element is situated. SPD functional elements (suspended particle device), known, for example, from EP 0876608 B1 and WO 2011033313 A1, are an example of such functional elements. The transmittance of visible light through SPD functional elements can be controlled by the applied voltage. PDLC functional elements (polymer dispersed liquid crystal), known, for example, from DE 102008026339 A1, are another example. The active layer contains liquid crystals that are incorporated into a polymer matrix. When no voltage is applied, the liquid crystals are oriented in a disorderly manner, resulting in strong scattering of the light passing through the active layer. When a voltage is applied to the flat electrodes, the liquid crystals align themselves in a common direction and the transmittance of light through the active layer is increased. The PDLC functional element acts less by reducing total transmittance than by increasing scattering, thus preventing free through-vision or making it possible to ensure protection against glare. In addition, electrochromic functional elements are known, for example, from US 20120026573 A1, WO 2010147494 A1, and EP 1862849 A1 and WO 2012007334 A1, in which a change in transmittance occurs as a result of electrochemical processes induced by the applied electric voltage.

Such glazing units can, for example, be used as vehicle panes whose light transmittance behavior can then be electrically controlled. They can, for example, be used as roof panels to reduce solar radiation or diminish distracting reflections. Such roof panels are known, for example, from DE 10043141 A1 and EP 3456913 A1. Windshields have also been proposed in which an electrically controllable sun visor is implemented using a switchable functional element to replace prior art mechanically flippable sun visors in motor vehicles. Windshields with electrically controllable sun visors are known, for example, from DE 102013001334 A1, DE 102005049081 B3, DE 102005007427 A1, and DE 102007027296 A1.

It is also known to provide such a glazing unit or the switchable functional elements with multiple switching regions whose optical properties can be switched independently of one another. For example, one region of the functional element can be selectively darkened or provided with a high degree of light scattering, while other regions remain transparent. Glazing units with independent switching regions and a method for the production are known, for example, from WO 2014072137 A1. Reference is also made to WO 2017157626 A1.

The independent switching regions are typically formed by dividing one of the flat electrodes by insulation lines into regions separated from one another (segments) that are in each case connected to the control unit independently of one another and, consequently, can be controlled independently, whereas the other flat electrode has no insulation lines. The insulation lines are typically introduced into the flat electrode by laser processing. The flat electrodes cannot be selected for optimum electrical conductivity since they must be transparent in order to ensure through-vision through the composite pane. Typically, ITO layers, which have comparatively low conductivity or comparatively high electrical resistance, are used as flat electrodes. This creates a problem when only some of the switching regions are subjected to a voltage. The voltage results in a flow of current through the active layer in the respective switching region, which, in turn, leads to a potential shift in the non-segmented flat electrode, due to its electrical resistance. This effect is also referred to as "ground shift". As a result, a certain voltage is now also generated in those switching regions that are not actually intended to be switched, which then also change their optical properties to a certain extent without this being desired. This effect is also referred to as "crosstalk" between the switching regions. The crosstalk is, in particular, disturbing because switching regions that should not be activated and therefore should be voltage free are typically switched to the connection potential of the non-segmented flat electrode (reference potential, ground), in order to ensure, on the one hand, a rapid discharge of the individual segments if they are switched off and, on the other, to avoid an influence of so-called "dirt resistances" (unwanted electrical connections due to dust or moisture). This forms a closed circuit through all switching regions.

In principle, it would be possible to avoid crosstalk by also segmenting the second flat electrode by insulation lines corresponding to the switching regions. However, if both flat electrodes are to be segmented in one processing step, strong laser radiation is required for this, which reduces the aesthetic appearance of the composite pane, for example, as a result of combustion effects. If, alternatively, the two flat electrodes are segmented individually, it is difficult to align the two flat electrodes precisely. In addition, "double" insulation lines in the two flat electrodes are always more conspicuous visually than insulation lines in only one flat electrode, even if they are perfectly aligned.

WO 2019011891 A1 discloses a glazing unit with electrically controllable optical properties, wherein the temperature of the composite pane is ascertained and the electric voltage that is applied to the flat electrodes of the electrically controllable functional element is selected as a function of the temperature. This is intended to counteract damaging the functional element due to local overheating. The functional element can optionally be segmented into multiple independent switching regions, with WO 2019011891 A1 suggesting dividing both flat electrodes by insulation lines into electrode segments for this purpose. The problem of crosstalk does not occur in this case.

From US 2014300945 A1, it is known that the temperature of a window pane can be determined by measuring the impedance of the active layer of an electrochromic functional element.

Consequently, there is a need for improved glazing units with electrically controllable optical properties with multiple independent switching regions, in which the effect of crosstalk between activated and non-activated switching regions is avoided or at least significantly reduced. The object of the present invention is to provide such an improved glazing unit and a method for its control.

The object is accomplished according to the invention by a glazing unit with electrically controllable optical properties with multiple independent switching regions that comprises a composite pane and a control unit. The composite pane comprises an outer pane and an inner pane that are joined to one another via a thermoplastic intermediate layer and an electrically controllable functional element that is arranged between the outer pane and the inner pane. The functional element has an active layer with electrically controllable optical properties between a first flat electrode and a second flat electrode. The control unit is suitable for controlling the optical properties of the functional element. The first flat electrode is divided by at least one insulation line into at least two separate electrode segments. Each electrode segment of the first flat electrode and the second flat electrode are electrically connected to the control unit such that an electric voltage can be applied between each electrode segment of the first flat electrode and the second flat electrode independently of one another in order to control the optical properties of the section of the active layer situated therebetween.

According to the invention, the control unit is suitable for ascertaining the temperature of the composite pane and applying an electric voltage between the electrode segments of the first flat electrode, on the one hand, and the second flat electrode, on the other, the magnitude of which voltage is a function of the temperature of the composite pane.

The object is further accomplished by a method for controlling a glazing unit according to the invention which has electrically controllable optical properties and multiple independent switching regions. The method according to the invention is distinguished by the fact that the temperature of the composite pane is determined and an electric voltage, whose magnitude depends on the temperature determined, is applied by means of the control unit between at least one electrode segment of the first flat electrode, on the one hand, and the second flat electrode, on the other.

The glazing unit and the method are presented together in the following, with explanations and preferred embodiments referring equally to the glazing unit and the method. When preferred features are mentioned in connection with the method, this means that the glazing unit is also accordingly designed and suitable. Conversely, when preferred features are described in connection with the glazing unit, this means that the method is also carried out accordingly.

The invention is based on the finding that the switching behavior of typical electrically switchable functional elements is temperature-dependent. A given voltage applied to the flat electrodes results in a greater change in the optical properties, the higher the temperature. On the one hand, this has the consequence that the disturbing effect of crosstalk is more pronounced at higher temperatures because the voltage induced as a result of the ground shift in the switching regions that actually are intended to be voltage free causes a stronger change in the optical properties, i.e., a more pronounced switching state. However, on the other hand, with higher temperatures, lower voltages are required to achieve a desired switching state of the switching regions. If the temperature of the composite pane is taken into account when determining the voltage to be applied, on the one hand, the desired switching state is precisely set and, on the other, the disturbing crosstalk (i.e., the unintentional switching of regions that should actually be voltage free) is minimized, in particular due to the fact that the voltage is selected just high enough to achieve the desired switching state at a given temperature. This is the major advantage of the invention.

The composite pane according to the invention comprises at least an outer pane and an inner pane joined to one another via a thermoplastic intermediate layer. The composite pane is provided, in a window opening (in particular a window opening of a vehicle, but, alternatively, also a window opening of a building, or a room) to separate the interior from the external surroundings. In the context of the invention, "inner pane" refers to the pane facing the interior. "Outer pane" refers to the pane facing the external surroundings. The outer pane and the inner pane have, in each case, an exterior-side surface and an interior-side surface and a circumferential side edge running therebetween. In the context of the invention, "exterior-side surface" refers to that main surface intended to face the external surroundings in the installed position. In the context of the invention, "interior-side surface" refers to that main surface intended to face the interior in the installed position. The interior-side surface of the outer pane and the exterior-side surface of the inner pane face one another and are joined to one another by the thermoplastic intermediate layer.

The composite pane according to the invention contains a functional element with electrically controllable optical properties that is arranged between the outer pane and the inner pane, i.e., integrated into the intermediate layer. The functional element is preferably arranged between at least two layers of thermoplastic material of the intermediate layer, whereby it is joined to the outer pane by the first layer and to the inner pane by the second layer. However, alternatively, the functional element can also be arranged directly on the surface of the outer pane or the inner pane facing the intermediate layer. Preferably, the side edge of the functional element is completely surrounded by the intermediate layer such that the functional element does not extend all the way to the side edge of the composite pane and thus has no contact with the surrounding atmosphere.

The functional element comprises at least one active layer and two flat electrodes arranged on both sides of the active layer such that the active layer is arranged between the flat electrodes. The flat electrodes and the active layer are typically arranged substantially parallel to the surfaces of the outer pane and the inner pane. The active layer has the variable optical properties that can be controlled by an electric voltage applied to the active layer via the flat electrodes. In the context of the invention, "electrically controllable optical properties" means, in particular, those properties that can be controlled continuously. In the context of the invention, the term "switching state of the functional element" refers to the extent to which the optical properties are changed compared to the voltage-free state. A switching state of 0% corresponds to the voltage-free state; a switching state of 100%, to the maximum change in the optical properties. By suitable selection of the voltage, all switching states therebetween can be realized continuously. A switching state of 20% corresponds, for example, to a change in the optical properties of 20% of the maximum change. Said optical properties relate in particular to light transmittance and/or scattering behavior.

In principle, however, it is also conceivable for the electrically controllable optical properties to only be able to be switched between two discrete states. In that case, there are only two switching states, namely 0% and 100%. Likewise, it is conceivable for the electrically controllable optical properties to be able to be switched between more than two discrete states.

The flat electrodes are preferably transparent, meaning, in the context of the invention, that they have light transmittance in the visible spectral range of at least 50%, preferably at least 70%, particularly preferably at least 80%. The flat electrodes preferably contain at least one metal, a metal alloy, or a transparent conducting oxide (TCO). The flat electrodes can, for example, be based on silver, gold, copper, nickel, chromium, tungsten, indium tin oxide (ITO), gallium-doped or aluminum-doped zinc oxide, and/or fluorine-doped or antimony-doped tin oxide, preferably based on silver or ITO. The flat electrodes preferably have a thickness from 10 nm to 2 μm, particularly preferably from 20 nm to 1 μm, most particularly preferably from 30 nm to 500 nm.

According to the invention, the first flat electrode has at least two segments (electrode segments), which are separated from one another by an insulation line. "Insulation line" means a linear region in which the material of the flat electrode is not present such that the adjacent segments are materially separated from one another and, consequently, electrically isolated from one another. This means that there is no direct electrical connection between the electrode segments, although the electrode segments can be indirectly connected to one another electrically conductively to a certain extent via the active layer situated in contact with them. The first flat electrode can be divided into multiple segments by multiple insulation lines. Each electrode segment forms a switching region of the glazing arrangement. The number of electrode segments can be freely selected by the person skilled in the art according to the requirements of the individual case. In a preferred embodiment, the insulation lines run substantially parallel to one another and extend from one side edge of the flat electrode to the opposite side edge. However, any other geometric shapes are also conceivable.

The insulation lines have, for example, a width of 5 μm to 500 μm, in particular 20 μm to 200 μm. They are preferably introduced into the flat electrode by means of laser radiation. The width of the segments, i.e., the distance between adjacent insulation lines can be suitably selected by the person skilled in the art in accordance with the requirements of the individual case.

The second flat electrode and the active layer preferably form in each case a coherent, complete layer not divided into segments by insulation lines. In principle, however, it is also conceivable for the second flat electrode to be segmented to a lesser extent than the first flat electrode, i.e., to have fewer insulation lines and electrode segments such that at least one electrode segment of the second flat electrode is associated with multiple electrode segments of the first flat electrode. In this case as well, the problem of crosstalk occurs, which can be reduced by the approach according to the invention. Each insulation line of the second flat electrode is arranged in alignment with an insulation line of the first electrode in the direction of vision through the composite pane.

The electrode segments of the first flat electrode are electrically connected, independently of one another, to the control unit such that on each electrode segment (independently of the other electrode segments), a first (in the case of AC voltage, time-varying) electrical potential, referred to in the context of the invention as a switching potential, can be applied. The second flat electrode is likewise electrically connected to the control unit such that a second electrical potential can be applied on the second flat electrode as a whole, referred to in the context of the invention as a "reference potential" (ground). If the first and the second potential are identical, there is no voltage in the respective switching region between the electrodes (switching state 0%). If the first and second potential are different, there is a voltage between the electrodes in the respective region, as a result of which a finite switching state is produced.

In a variant of the invention, the second flat electrode is also segmented, but to a lesser extent than the first flat electrode such that that at least one electrode segment of the second flat electrode is associated with multiple electrode segments of the first flat electrode. In this case, the electrode segments of the second flat electrode are also electrically connected to the control unit independently of one another such that a second electrical potential (reference potential, "ground") can be applied to each electrode segment (independently of the other electrode segments). However, there is at least one electrode segment of the second flat electrode that provides the reference potential for multiple switching regions. The affected switching regions can be controlled independently of one another in that the switching potential can be applied on the electrode segments of the first flat electrode independently of one another, whereas a single reference potential is applied to the associated electrode segment of the second flat electrode overall.

The control unit is provided for and suitable for controlling the optical properties of the functional element. The control unit is electrically conductively connected to the flat electrodes of the functional element, on the one hand; and to a voltage source, on the other. The control unit contains the necessary electrical and/or electronic components to apply the necessary voltage on the flat electrodes as a function of a switching state. The switching state can be specified by the user (for example, by operating a switch, a button, or a rotary or sliding controller), ascertained by sensors, and/or transmitted via a digital interface from the vehicle's central control device (if the composite pane is a vehicle pane, usually LIN bus or CAN bus). The switches, buttons, rotary or sliding controllers can, for example, be integrated into the vehicle's dashboard if the composite pane is a vehicle pane. However, touch switching surfaces can also be integrated directly into the composite pane, for example, capacitive or resistive switching surfaces. Alternatively, the functional element can also be controlled by contactless methods, for example, by gesture recognition, or as a function of the state of pupils or eyelids detected by a camera and suitable evaluation electronics. The control unit can, for example, include electronic processors, voltage converters, transistors, and other components.

The voltage applied to the flat electrodes is preferably AC voltage. In a preferred embodiment, the voltage source is a DC voltage source that provides a DC voltage and supplies the control unit. This situation occurs, for example, in a vehicle when the composite pane is a vehicle window and is connected to the on-board voltage. In this case, the control unit is preferably connected to the on-board electrical system from which it obtains its electric voltage and optionally the information about the switching state. The control unit is then equipped with at least one inverter to convert the DC voltage into an AC voltage. In a first embodiment, the control unit has a single inverter. For the separate control of the electrode segments of the first flat electrode, an output pole of the inverter has multiple independent outputs, with each electrode segment connected to one of the outputs. I.e., one output of the inverter is associated with each switching region and connected to the associated electrode segment of the first flat electrode. The individual outputs are typically implemented by switches, with the inverter generating a voltage which is subsequently switched. These switches can be integrated directly in the inverter. Alternatively, however, it is also possible for the inverter itself to have, strictly speaking, only a single output, to which external switches are then connected in order to distribute the voltage to the switching regions. In the context of the invention, such externally connected switches are also considered as outputs of the inverter. The second flat electrode is also connected to the inverter. In a second embodiment, the control unit has multiple inverters, with each electrode segment connected to its own inverter for separate control of the electrode segments of the first flat electrode. I.e., an inverter is associated with each switching region and is connected to the associated electrode segment of the first flat electrode. The first embodiment has the advantage that it is more economical and more space-saving. However, it has the disadvantage that the switching regions can only be switched digitally, so to speak, between a switching state of 0% and a finite switching state that corresponds to the output voltage of the inverter that is currently present. The switching regions cannot be provided with different finite switching states (be, so to speak, independently dimmable), which is easily possible in the second embodiment.

The inverter or the inverters can be operated such that a real AC voltage is generated, including its negative components. This is possible both for the case in which only a single inverter with independent outputs is present and for the case in which a dedicated inverter is associated with each switching region. However, since, in the case of a DC voltage source, as in the case of a vehicle, for example, no negative potentials are available, this solution is comparatively complex from a technical standpoint. Alternatively, it is possible, and often preferred, to simulate the AC voltage, so to speak. In this case, the control unit is equipped with multiple inverters, wherein each electrode segment of the first flat electrode is connected to a separate inverter and the second flat electrode is connected to a further inverter. Thus, a dedicated inverter is associated in each case with each electrode segment of the first flat electrode and the second flat electrode. The potentials of the inverters are modulated with a variable function, for example, a sine function, with the potentials of the inverter of the electrode segments of the first flat electrode being in phase and the potential of the inverter of the second flat electrode phase-shifted relative thereto, in particular with the phase shift of 180°. The signal for the second surface electrode is then inverted relative to that of the first flat electrode. Thus, a time-varying, periodic potential difference is generated, with alternating relatively positive and relatively negative contributions, which corresponds to an AC voltage.

Since the on-board voltage of vehicles (for example, 12 to 14 V) is typically insufficient to completely switch the functional element, the control unit is also preferably equipped with a DC/DC converter suitable for increasing the supply voltage provided (primary voltage), i.e., for converting it into a higher secondary voltage (for example, 65 V). The use of a DC/DC converter is not limited to the situation in vehicles, but can also be necessary or advantageous in other cases. The control unit is connected to the DC voltage source and supplied by it with a primary voltage. The primary voltage is converted by the DC/DC converter into the higher secondary voltage. The secondary voltage is converted by the inverter, for which it is suitable, into an AC voltage (for example, 48 V). The AC voltage is then applied, on the one hand, to the electrode segments of the first flat electrode and, on the other, to the second flat electrode.

The secondary voltage is, in an advantageous embodiment, from 5 V to 70 V; the AC voltage, from 5 V to 50 V.

The functional element is preferably operated by the control unit such that the electrode segments of the first flat electrode in those switching regions which are intended to have a switching state of 0% are subjected to an electrical potential that corresponds to the nominal potential of the second surface electrode. Due to the described potential shift of the second flat electrode ("ground shift"), the undesirable crosstalk occurs. With this type of circuit, all switching regions form a closed circuit involving all electrode segments of the first flat electrode as well as the second flat electrode. It is advantageous in terms of fast switching behavior due to rapid discharge of the individual switching regions. In addition, a disturbing influence of so-called "dirt resistors" (undesirable electrical connections due to dust or moisture) is avoided.

According to the invention, the temperature of the composite pane is determined in order to adapt the voltage to be applied to this temperature. It is assumed that the composite pane as a whole has a homogeneous temperature, i.e., the temperature of the functional element matches the temperature of other regions of the composite pane, which is typically at least approx. the case. The determination of the temperature of the composite pane accordingly corresponds at least approx. to the determination of the temperature of the functional element.

In an advantageous embodiment, the composite pane is equipped with a temperature sensor. The temperature sensor is connected to the control unit such that the control unit can ascertain the temperature of the composite pane by means of the temperature sensor. The measurement signal of the temperature sensor is thus transmitted to the control unit and evaluated there such that the control unit determines the temperature of the composite pane by means of the temperature sensor. The temperature sensor can be integrated in the composite pane by embedding it in the intermediate layer. Alternatively, the temperature sensor can be attached externally on the composite pane or be associated therewith. Preferably, the temperature sensor is attached to the interior-side surface of the inner pane. The temperature sensor| can also be arranged in the control unit itself or in an fastening element with which the control unit is attached to the composite pane. In principle, a temperature sensor can also be used that is not attached directly to or integrated into the composite pane, but, instead, measures the temperature from a distance, for example, an IR sensor that is arranged in the vicinity of the composite pane and is directed toward it.

In a further advantageous embodiment, the control unit is suitable for determining the electrical impedance of the active layer and, therefrom, determining the temperature of the composite pane, more precisely of the functional element. This is possible since the impedance (the equivalent of the classical electrochromic resistance with AC voltages) is temperature-dependent. In particular, there is an injective relationship between the real part of the electrical impedance and the temperature of the functional element. In this way, one temperature can be associated with each impedance. In particular, the real part of the impedance is strictly monotonically decreasing as a function of the temperature. The embodiment has the advantage that is possible to dispense with a temperature sensor, which has to be integrated as a further component and, consequently, complicates the structure and increases production costs. The method is executed in such a way that the control unit determines the impedance of the active layer and, therefrom, determines or estimates the temperature of the composite pane. For this purpose, in particular, a voltage is applied and the resultant flow of current is determined. The impedance can be calculated as the quotient of the voltage and the flow of current. Calibration data, for example, a calibration curve or table, which describe the temperature dependence of the impedance (more precisely, of the real part of the impedance) are stored in the control unit (impedance as a function of the temperature or temperature as a function of the impedance). By comparing the magnitude of the measured impedance with the calibration data, the control unit can approximate the temperature.

When determining impedance, different embodiments are again possible, in particular in terms of the measurement of power consumption. If the control unit includes at least one inverter that converts incoming DC voltage into outgoing AC voltage, the output current of the inverter can be measured. Problematic in this case is the fact that the current thus determined ("apparent current" or also "total current") is composed of two components, namely the reactive current (figuratively speaking, caused by the "back-and-forth pushing" of electrons as a result of the AC voltage and the capacitively acting functional element) and the active current (caused by parasitic losses in the supply lines and in the functional element). However, only the active current is decisive for determining the impedance (more precisely, the real part). The active component of the measured current (active current) must then be calculated from the total current by the control unit, for example, by determining the phase shift between voltage and apparent current.

Alternatively, in a particularly preferred variant, the impedance can be determined from a measurement of the current draw of the inverter. The control unit is suitable for this determination. Since only DC voltages are present here, any reactive current disappears in the average over time, provided it was not already intercepted by the intermediate circuit capacitors in the inverter. The measured current can be used directly to determine the impedance, taking into account a loss factor in the inverter. A further advantage is that this measurement of current is frequently already available for error detection (short-circuit and overload) and it is possible to dispense with additional component expense.

The above-described possibilities for determining the impedance by measuring outgoing current or preferably current draw of an inverter and ascertaining the temperature therefrom can always be used if the control unit is equipped with such an inverter, which converts a DC voltage provided by a DC voltage source (directly or indirectly) into an AC voltage. The converted DC voltage (input signal of the inverter) can be the primary voltage that is provided by the DC voltage source (direct conversion). The converted DC voltage can, however, also be a a secondary voltage (in particular, higher) into which said primary voltage was previously converted by a DC/DC converter (indirect conversion).

If the temperature of the composite pane or the functional element is known, the voltage (in particular, AC voltage) that is required to achieve a certain switching state can be ascertained by the control unit. In particular, the lower said voltage, the higher the temperature. Again, for this purpose, calibration data are stored in the control unit, for example, calibration curves or calibration tables, containing voltage values as a function of temperature, on the one hand, and the switching state, on the other. Thus, the voltage value required can be ascertained by the control unit as a function of the desired switching state (for example, 50%) and the temperature ascertained (for example, 60° C.) and applied to the flat electrodes of the respective switching region.

The calibration data are preferably available as continuous calibration curves such that a voltage value is associated with each pair of values from temperature and switching state. The calibration curve can, for example, be created because of the fact that individual points are known through measurements, between which interpolation is performed (for example, linearly). However, in principle, it is also possible for the calibration data to be available in table form, with a common voltage value associated with specific ranges of temperature in each case. The latter is less preferable since a sudden change in switching behavior can occur during the transition from one temperature range to the other, which is irritating for the user.

Typically, the temperature dependency of the switching behavior is quite pronounced above a certain limit temperature, whereas the temperature-dependent change below the limit temperature is comparatively less pronounced. For common functional elements, the limit temperature is typically about 60° C. Higher temperatures occur in particular with strong solar radiation. Consequently, in a further development of the invention, it is possible to execute methods such that the temperature is determined, and in the event that the temperature is lower than a predefined limit temperature (for example, 50° C. or 60° C.), a temperature-independent voltage is applied to the flat electrodes, whereas, in the event that the temperature is greater than the limit temperature, a temperature-dependent voltage according to the invention is applied.

In a preferred embodiment, the functional element is a PDLC functional element (polymer dispersed liquid crystal). The active layer of a PDLC functional element contains liquid crystals that are incorporated into a polymer matrix. When no voltage is applied to the flat electrodes, the liquid crystals are aligned in a disorderly manner, resulting in strong scattering of the light passing through the active layer. When a voltage is applied to the flat electrodes, the liquid crystals align themselves in a common direction and the transmittance of light through the active layer is increased. However, other functional elements can also be used whose optical property variability is based on liquid crystals, for example, PNLC functional elements (polymer networked liquid crystal).

In another preferred embodiment, the functional element is an SPD functional element (suspended particle device). The active layer contains suspended particles, with the absorption of light by the active layer being variable by application of a voltage to the flat electrodes.

In another preferred embodiment, the active layer of the functional element is an electrochemically active layer. Such functional elements are known as electrochromic functional elements. The transmittance of visible light depends on the rate of ion storage in the active layer, with the ions provided, for example, by an ion storage layer between an active layer and a flat electrode. The transmittance can be influenced by the voltage applied to the flat electrodes, which causes a migration of the ions. Suitable functional layers contain, for example, at least tungsten oxide or vanadium oxide.

The adjustable functional elements mentioned and their mode of operation are known per se to the person skilled in the art such that a detailed description can be dispensed with here.

In an advantageous embodiment, the functional element comprises, in addition to the active layer and the flat electrodes, two carrier films, with the active layer and the flat electrodes preferably arranged between the carrier films. The carrier films are preferably formed from a thermoplastic material, for example, based on polyethylene terephthalate (PET), polypropylene, polyvinyl chloride, fluorinated ethylene-propylenes, polyvinyl fluoride, or ethylene tetrafluoroethylene, particularly preferably based on PET. The thickness of the carrier films is preferably from 10 µm to 200 µm.

Such functional elements can advantageously be provided as multilayer films, in particular can be purchased, trimmed to the desired size and shape, and then laminated into the composite pane, preferably by a thermoplastic bonding layer with the outer pane and the inner pane. It is possible to segment the first flat electrode by laser radiation, even when it is embedded in such a multilayer film. The laser processing can produce a thin, optically inconspicuous insulation line without damaging the carrier film typically positioned above it.

The side edge of the functional element can be sealed, for example, by fusing the carrier layers or by a (preferably polymeric) tape. In this way, the active layer can be protected, in particular against components of the intermediate layer (in particular plasticizers) diffusing into the active layer, which can result in degradation of the functional element.

For the electrical contacting of the flat electrodes or electrode segments, they are preferably connected to so-called flat or foil conductors that extend out of the intermediate layer beyond the side edge of the composite pane. Flat conductors have a strip-like metallic layer as a conductive core that is typically surrounded, with the exception of the contact surfaces, by a polymeric insulating sheath. Optionally, so-called bus bars, for example, strips of an electrically conductive foil (for example, copper foil) or electrically conductive imprints are arranged on the flat electrodes, with the flat conductors or foil conductors connected to these bus bars. The flat or foil conductors are connected to the control unit directly or via further conductors.

In an advantageous embodiment, the control unit is attached to the interior-side surface of the inner pane facing away from the intermediate layer. The control unit can, for example, be bonded directly to the surface of the inner pane. In an advantageous embodiment, the control unit is inserted into a fastening element, which is, in turn, attached to the interior-side surface of the inner pane, preferably via a layer of an adhesive. Such fastening elements are also known as brackets in the vehicle sector and are typically made of plastic. As a result of the mounting of the control unit directly on the composite pane, the electrical connection thereof is facilitated. In particular, no long cables are required between the control unit and the functional element.

Alternatively, however, it is also possible for the control unit not to be attached to the composite pane, but, instead, to be integrated into the vehicle's electrical system, for example, or to be attached to the vehicle body if the composite pane is a vehicle window. The control unit is preferably arranged in the interior of the vehicle such that it is not visible, for example, in the dashboard or behind a wall panel.

The composite pane can be equipped with an opaque masking print, in particular in a circumferential edge region, as is common in the vehicle sector, in particular for windshields, rear windows, and roof panels. The masking print is typically formed from an enamel containing glass frits and a pigment, in particular black pigment. The printing ink is typically applied by screen printing and baked. Such a masking print is applied to at least one of the pane surfaces, preferably the interior-side surface of the outer pane and/or of the inner pane. The masking print preferably surrounds a central through-vision region in a frame-like manner and serves in particular to protect the adhesive by which the composite pane is bonded to the vehicle body against UV radiation. If the control unit is attached to the interior-side surface of the inner pane, preferably in the opaque region of the masking print.

The thermoplastic intermediate layer serves to join the two panes, as is customary with composite panes. Typically, thermoplastic films are used and the intermediate layer is formed therefrom. In a preferred embodiment, the intermediate layer is formed from at least a first thermoplastic layer and a second thermoplastic layer, between which the functional element is arranged. The functional element is then joined to the outer pane via a region of the first thermoplastic layer and to the inner pane via a region of the second thermoplastic layer. Preferably, the thermoplastic layers project circumferentially beyond the functional element. Where the thermoplastic layers are in direct contact with one another and are not separated from one another by the functional element, they can fuse during lamination such that the original layers are no longer recognizable and, instead, there is a homogeneous intermediate layer.

A thermoplastic layer can, for example, be formed by a single thermoplastic film. A thermoplastic layer can also be formed from sections of different thermoplastic films whose side edges are placed against one another.

In a preferred embodiment, the functional element, more precisely, the side edges of the functional element, is circumferentially surrounded by a third thermoplastic layer. The third thermoplastic layer is implemented like a frame with a recess in which the functional element is inserted. The third thermoplastic layer can be formed by a thermoplastic film in which the recess had been cut out. Alternatively, the third thermoplastic layer can also be composed of a plurality of film sections around the functional element. The intermediate layer is then formed from a total of at least three thermoplastic layers arranged flat atop one another, wherein the middle layer has a recess in which the functional element is arranged. During production, the third thermoplastic layer is arranged between the first and second thermoplastic layer, with the side edges of all thermoplastic layers preferably situated congruently. The third thermoplastic layer preferably has roughly the same thickness as the functional element. This compensates for the local difference in thickness that is introduced by the locally limited functional element such that glass breakage during lamination can be avoided and an improved visual appearance is created.

The layers of the intermediate layer are preferably formed from the same material, but can, however, in principle, also be made of different materials. The layers or films of the intermediate layer are preferably based on polyvinyl butyral (PVB), ethylene vinyl acetate (EVA), or polyurethane (PU). This means that the layer or film contains predominantly said material (content greater than 50 wt.-%) and, additionally, optionally, other components, for example, plasticizers, stabilizers, UV or IR absorbers. The thickness of each thermoplastic layer is preferably from 0.2 mm to 2 mm, particularly preferably from 0.3 mm to 1 mm. For example, films with the standard thicknesses of 0.38 mm or 0.76 mm can be used.

The outer pane and the inner pane are preferably made of glass, particularly preferably of soda lime glass, as is customary for window panes. The panes can, however, also be made of other types of glass, for example, quartz glass, borosilicate glass, or aluminosilicate glass, or of rigid clear plastics, for example, polycarbonate or polymethyl methacrylate. The panes can be clear, or also tinted or colored. Depending on the application, limits can be set for the degree of tinting or coloring: sometimes a prescribed light transmittance must be guaranteed, for example, light transmittance of at least 70% in the primary through-vision region A per Regulation No. 43 of the Economic Commission for Europe of the United Nations (UN/ECE) (ECE-R43, "Uniform Provisions Concerning the Approval of Safety Glazing Materials and Their Installation on Vehicles").

The outer pane, the inner pane, and/or the intermediate layer can have suitable coatings that are known per se, for example, anti-reflecting coatings, non-stick coatings, anti-scratch coatings, photocatalytic coatings, UV absorbing or reflecting coatings, or IR absorbing or reflecting coatings, such as sun-shading coatings or low-E coatings.

The thickness of the outer pane and the inner pane can vary widely and thus be adapted to the requirements in the individual case. The outer pane and the inner pane preferably have thicknesses from 0.5 mm to 5 mm, particularly preferably from 1 mm to 3 mm.

The invention also includes the use of a glazing unit according to the invention, in particular of the composite pane of a glazing unit according to the invention, in buildings or in means of locomotion for travel on land, in the air, or on water, preferably as a window pane of a vehicle, in particular a motor vehicle. The glazing unit can, for example, be used as a windshield, roof panel, rear window, or side window.

In a particularly preferred embodiment, the glazing unit or the composite pane is a windshield of a vehicle. In this case, the functional element is preferably used as an electrically controllable sun visor that is arranged in an upper region of the windshield, whereas the greater part of the windshield is not provided with the functional element. The switching regions are preferably arranged substantially parallel to the upper edge of the windshield at an increasing distance therefrom. The independently switchable switching regions enable the user to determine, depending on the position of the sun, the extent of the region adjacent the upper edge that should be darkened or provided with high light scattering to avoid glare from the sun.

In another preferred embodiment, the glazing unit or the composite pane is a roof panel of a vehicle. In this case, the functional element is preferably arranged in the entire through-vision region of the composite pane. In a typical embodiment, this through-vision region includes the entire composite pane minus a circumferential edge region that is provided with an opaque masking print on at least one of the surfaces of the panes. The functional element extends over the entire through-vision region, with its side edges arranged in the region of the opaque masking print and thus not visible to the viewer. The switching regions are preferably arranged substantially parallel to the front edge of the roof panel with increasing distance therefrom. As a result of the independently switchable switching regions, the user can specify which region of the roof panel is to be transparent and which is to be darkened or provided with high light scattering, for example, depending on the position of the sun, in order to avoid excessive heating of the vehicle interior. It is also possible for each vehicle occupant, i.e., for example, the driver, the front-seat passenger, the left and the right rear seat occupant, to be associated with a switching region located above them in each case.

The invention is explained in detail with reference to drawings and exemplary embodiments. The drawings are a schematic representation and are not to scale. The drawings in no way restrict the invention. They depict.

FIG. 1, FIG. 2, FIG. 3, and FIG. 4 depict in each case a detail of a glazing unit according to the invention with electrically controllable optical properties. The glazing unit comprises a composite pane that is, by way of example, provided as a roof panel of a passenger car, the light transmittance of which can be controlled electrically in regions. The composite pane comprises an outer pane 1 and an inner pane 2 that are joined to one another via an intermediate layer 3. The outer pane 1 and the inner pane 2 are made of soda lime glass, which can optionally be tinted. The outer pane 1 has, for example, a thickness of 2.1 mm; the inner pane 2, a thickness of 1.6 mm.

Figure 2:
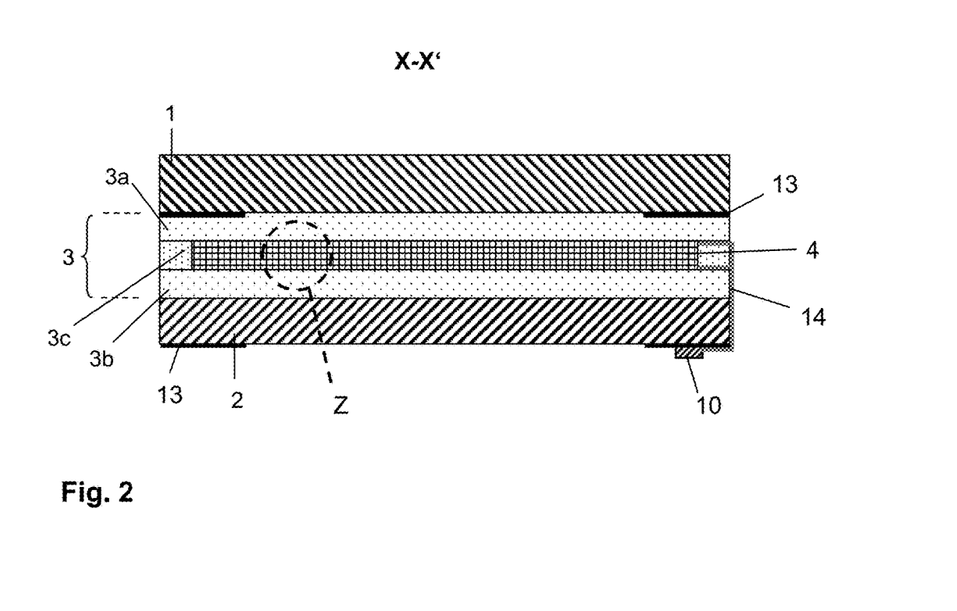
Figure 3:
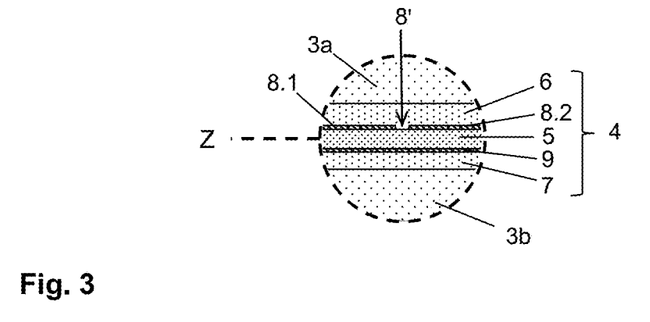

The intermediate layer 3 comprises a total of three thermoplastic layers 3a, 3b, 3c, formed in each case by a thermoplastic film made of PVB with a thickness of 0.38 mm. The first thermoplastic layer 3a is bonded to the outer pane 1; the second thermoplastic layer 3b, to the inner pane 2. The third thermoplastic layer 3c positioned therebetween has a cutout into which a functional element 4 with electrically controllable optical properties is inserted with a substantially precise fit, i.e., roughly flush on all sides. The third thermoplastic layer 3c thus forms, so to speak, a sort of passepartout or frame for the roughly 0.4-mm-thick functional element 4, which is thus encapsulated all around in thermoplastic material and is thus protected. The functional element 4 is, for example, a PDLC multilayer film, that can be switched from a clear, transparent state into a cloudy, non-transparent (diffuse) state. The functional element 4 is a multilayer film consisting of an active layer 5 between two flat electrodes 8, 9 and two carrier films 6, 7. The active layer 5 contains a polymer matrix with liquid crystals dispersed therein, which orient themselves as a function of the electric voltage applied on the flat electrodes 8, 9, as a result of which the optical properties can be regulated. The carrier films 6, 7 are made of PET and have a thickness of, for example, 0.125 mm. The carrier films 6, 7 are provided with a coating of ITO with a thickness of roughly 100 mm facing the active layer 5, which form the flat electrodes 8, 9. The flat electrodes 8, 9 are connected via bus bars (not shown) (formed, for example, from strips of a copper foil) to electric cables that establish the electrical connection to a control unit 10.

This control unit 10 is attached, by way of example, to the interior-side surface of the inner pane 2 facing away from the intermediate layer 3. For this purpose, for example, a fastening element (not shown), into which the control unit 10 is inserted, is bonded to the inner pane 2. The control unit 10 does not necessarily have to be attached directly to the composite pane. Alternatively, it can, for example, be attached to the dashboard or the vehicle body or integrated into the vehicle's on-board electrical system.

Figure 1:
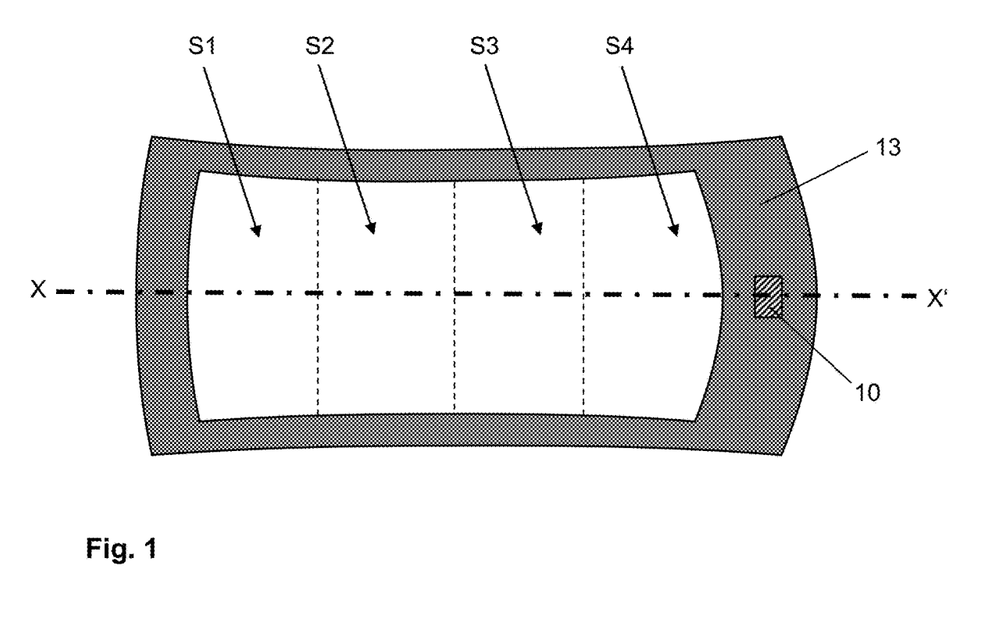
FIG. 1 a plan view of an embodiment of the glazing unit according to the invention, FIG. 2 a cross-section through the glazing unit of FIG. 1, FIG. 3 an enlarged representation of the region Z of FIG. 2, FIG. 4 the functional element of the glazing unit of FIG. 1 in an equivalent circuit diagram, FIG. 5 three schematic configurations of the control unit of a glazing unit according to the invention, and FIG. 6 a diagram of the power consumption as a function of the temperature of an electrically controllable functional element 4.

The composite pane has a circumferential edge region that is provided with an opaque masking print 13. This masking print 13 is typically made of a black enamel. It is screen-printed as a printing ink with a black pigment and glass frits and baked into the pane surface. The masking print 13 is, by way of example, applied on the interior-side surface of the outer pane and also on the interior-side surface of the inner pane 2. The side edges of the functional element 4 are concealed by this masking print 13. The control unit 10 is arranged in this opaque edge region, i.e., bonded to the masking print 13 of the inner pane 2. There, the control unit 10 does not interfere with the through-vision through the composite pane and is visually inconspicuous. In addition, there is a short distance to the side edge of the composite pane such that, advantageously, only short cables 14 are required for the electrical connection of the functional element 14.

On the other hand, the control unit 10 is connected to the vehicle's on-board electrical system, which is, for the sake of simplicity, not shown in FIGS. 1 and 2. The control unit 10 is suitable for applying, as a function of a switching signal which the driver specifies, for example, by pressing a button, the voltage to the flat electrodes 8, 9 of the functional element 4, which is necessary for the desired optical state of the functional element 4 (switching state).

The composite pane has, by way of example, four independent switching regions S1, S2, S3, S4, in which the switching state of the functional element 4 can be set independently of one another by the control unit 10. The switching regions S1, S2, S3, S4 are arranged one after another in the direction from the front edge to the rear edge of the roof panel, with the terms "front edge" and "rear edge" referring to the direction of travel of the vehicle. By means of the switching regions S1, S2, S3, S4, the driver of the vehicle can choose (for example, as a function of the position of the sun) to provide only one region of the composite pane with the diffuse state instead of the entire pane, while the other regions remain transparent.

In order to form the switching regions S1, S2, S3, S4, the first flat electrode 8 is interrupted by three insulation lines 8', which are arranged substantially parallel to one another and extend from one side edge to the opposite side edge of the functional element 4. The insulation lines 8' are typically introduced into the first flat electrode 8 by laser processing and divide it into four electrode segments 8.1, 8.2, 8.3, and 8.4 materially separated from one another. Each electrode segment 8.1, 8.2, 8.3, and 8.4 is connected to the control unit 10 independently of the others. The control unit is suitable for applying, independently of one another, an electric voltage between each electrode segment 8.1, 8.2, 8.3, and 8.4 of the first flat electrode 8, on the one hand, and the second flat electrode 9, on the other, such that the section of the active layer 5 situated therebetween is subjected to the voltage required to achieve a desired switching state.

Figure 4:
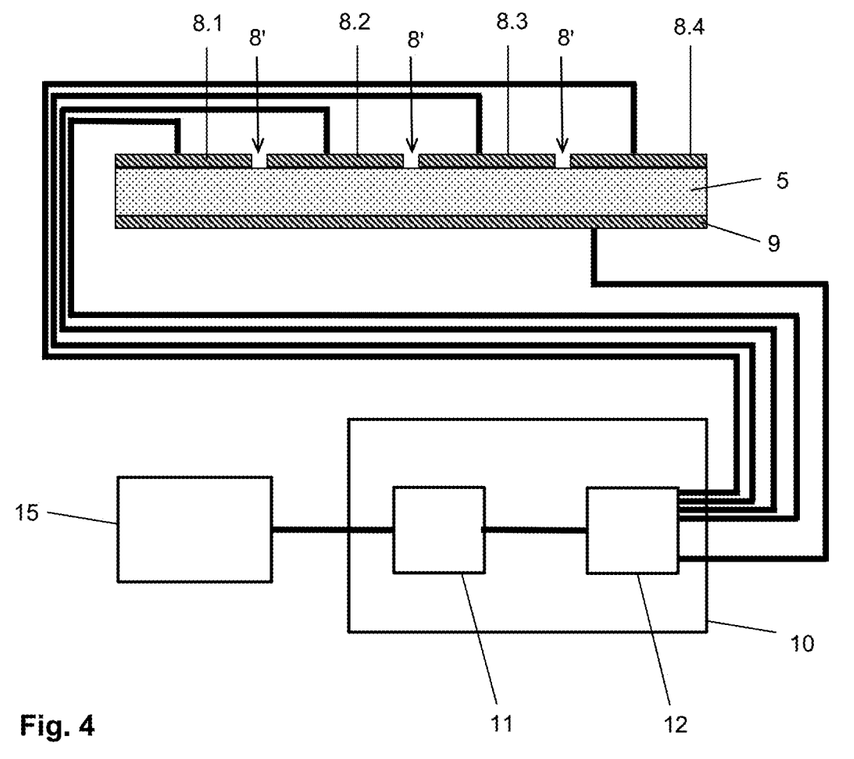

As illustrated in the equivalent circuit diagram of FIG. 4, the control unit 10 is connected to a voltage source 15 via the vehicle's on-board electrical system. In the vehicle sector, the voltage source 15 typically provides DC voltage in the range from 12 V to 14 V (on-board voltage of the vehicle). The control unit 10 is equipped with a DC/DC converter 11, which converts the on-board voltage (primary voltage) into DC voltage of a higher magnitude, for example, 65 V (secondary voltage). The secondary voltage must be sufficiently high to realize a switching state of the functional element 4 of 100%. The control unit 10 is also equipped with an inverter 12 that converts the secondary voltage into an AC voltage. One pole of the inverter 12 is connected to the second flat electrode 9. For the other pole, the inverter 12 has multiple independent outputs, each of which is connected to a respective electrode segment 8.1, 8.2, 8.3 and 8.4 with one of the independent outputs such that the switching state of the associated switching region S1, S2, S3, S4 can be set independently of the others.

With a switching state of 0%, the electrode segments 8.1, 8.2, 8.3, 8.4 and the second flat electrode 9 always have the same electrical potential such that no voltage is present. With a switching state greater than 0% of a switching region S1, S2, S3, S4, a voltage is present between the associated electrode segment 8.1, 8.2, 8.3, 8.4 and the second flat electrode 9. As a result of the voltage, a current flows through the associated section of the active layer 5. Since the ITO layers functioning as electrodes 8, 9 have comparatively high electrical resistance, this flow of current leads to a potential shift of the second flat electrode 9. The consequence is that in switching regions S1, S2, S3, S4, which should actually have a voltage-free switching state of 0%, a certain voltage is generated such that in the switching region concerned, a finite switching state greater than 0% is produced, which is actually not desired. This situation is referred to as a communication (crosstalk) between the switching regions S1, S2, S3, S4.

The effect of the crosstalk is more noticeable at higher temperatures since, for one thing, the sensitivity of the functional element 4 to small voltages increases and, for another, the conductivity of the flat electrodes 8, 9 decreases (i.e., their resistance increases), as a result of which the voltage drop created is greater. Typically, crosstalk is particularly troublesome at temperatures above 60° C. It is also easily understandable that crosstalk is more troublesome, the more switching regions S1, S2, S3, S4 are activated, i.e., deliberately subjected to a voltage in order to produce a finite switching state, since then current flows through multiple switching regions and is thus stronger such that the potential shift of the second flat electrode is more pronounced. Likewise, the crosstalk is more pronounced, the higher the switching state of the active switching region(s).

A higher temperature results, on the other hand, in the fact that a lower voltage is required to achieve a desired switching state. This effect is exploited according to the invention by applying a voltage to the flat electrodes 8, 9, the magnitude of which depends on the temperature. For this purpose, the temperature of the composite pane or of the functional element 4 is first ascertained. Based on calibration data, the control unit 10 then determines the voltage required at a given temperature to achieve the switching state set by the user. This voltage is then applied to the relevant switching region. The advantage consists, on the one hand, in the fact that even switching states of less than 100% can be set very precisely; on the other, the voltage applied is minimally selected in light of the switching states, as a result of which the disturbing effect of crosstalk is also minimized. The control unit is equipped with the necessary components (not shown), in particular data memory for storing the calibration data and a processor for performing the necessary calculation operations and for controlling the individual outputs of the inverter, with which the different electrode segments 8.1, 8.2, 8.3, 8.4 are controlled.

To ascertain the temperature, the composite pane can be equipped, for example, with a temperature sensor that transmits the measured temperature to the control unit. It is possible to dispense with a temperature sensor if the temperature of the functional element 4 is estimated approx. based on the impedance of the active layer 5. An applied voltage results in a flow of current through the active layer 5, the extent of which is a function of the temperature-dependent electrical impedance. If the current draw is determined when a voltage is applied, the flow of current or the impedance of the active layer 5, and therefrom, in turn, the temperature can be determined approximately. For this purpose, calibration data that link the impedance of the active layer 5 to the temperature are stored in the control unit 10.

Figure 5:
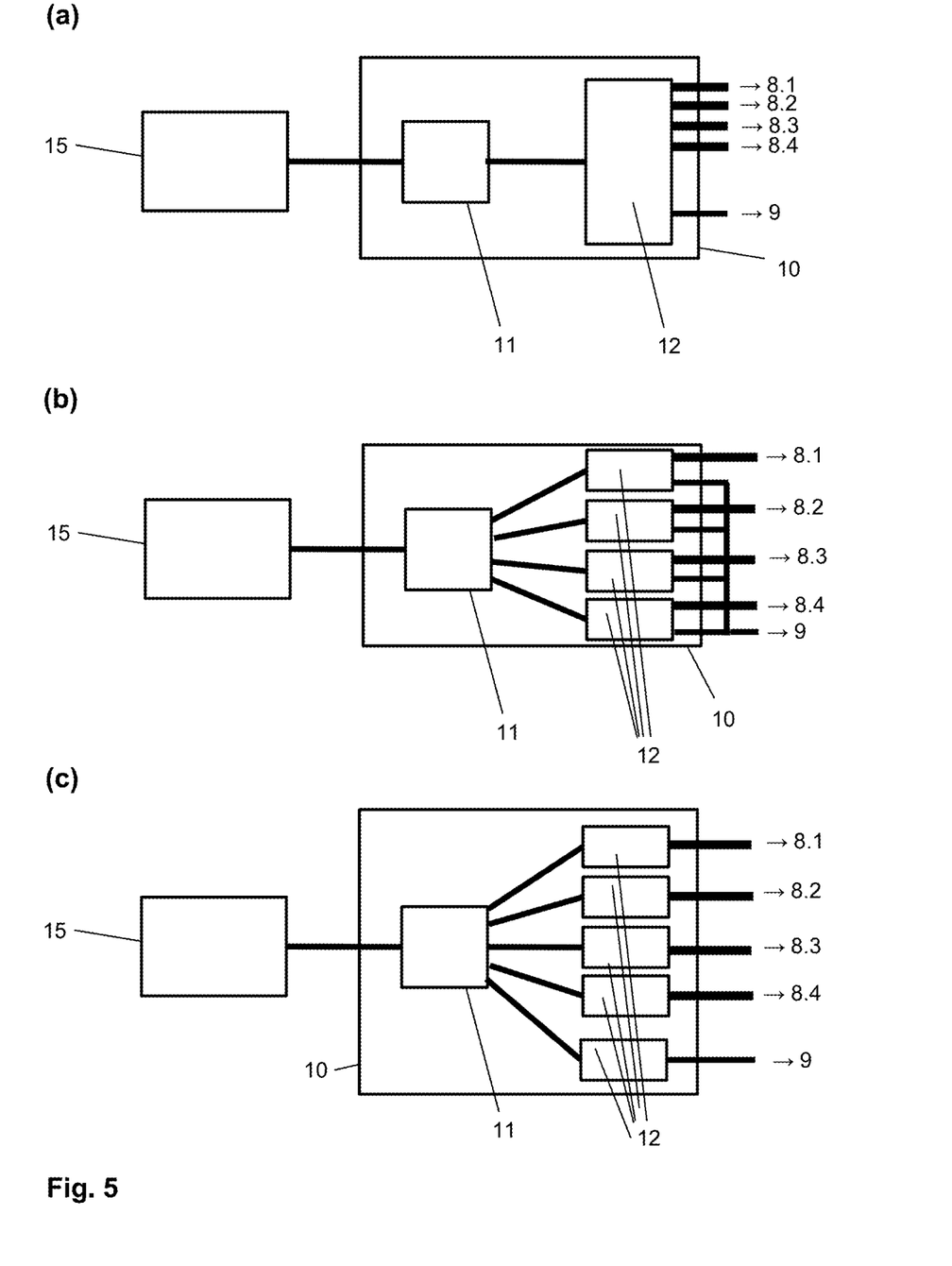

FIG. 5 depicts schematic equivalent circuit diagrams of the control unit 10 connected to the DC voltage source 15 in three configurations. The connections to the electrode segments 8.1, 8.2, 8.3, 8.4 and to the second flat electrode 9 are symbolized by arrows for simplicity; the functional element 4 itself is not depicted.

In the configuration of FIG. 5a, the control unit 10 has a single inverter 12, which is connected, on the one hand, to the second flat electrode 9 and, on the other, via separate outputs, to the electrode segments 8.1, 8.2, 8.3, 8.4. This configuration corresponds to that of FIG. 4. The outputs are typically implemented as switches by which the signal is divided among the electrode segments 8.1, 8.2, 8.3, 8.4. The switches do not necessarily have to be integrated in the inverter 12, as indicated in the figure, but can also be connected thereto as external components. Due to the single inverter 12, the control unit is technically simply constructed, economical, and space-saving. As a result, the switching regions S1, S2, S3, S4 cannot be controlled completely independently of one another. Instead, each switching region S1, S2, S3, S4 can only be switched between a switching state of 0% and a switching state X, where X is the same for all switching regions S1, S2, S3, S4.

In the configuration of FIG. 5b, the control unit 10 has four inverters 12. Each inverter 12 is connected, on the one hand, to the second flat electrode 9 and, on the other, to one of the electrode segments 8.1, 8.2, 8.3, 8.4 respectively. Here, the switching regions S1, S2, S3, S4 can be controlled completely independently of one another such that, for example, the switching region S1 can have a switching state of 100%; the switching region S2, a switching state of 50%; and the switching regions S3, S4, a switching state of 0%.

In the configurations of FIGS. 5a and 5b, it is necessary for the inverter or inverters 12 to generate a real AC voltage, including the negative components, which is technically comparatively complex. FIG. 5c depicts, in contrast, a configuration in which an AC voltage is simulated, so to speak. The control unit 10 has five inverters 12, with four of the inverters 12 connected in each case to one of the electrode segments 8.1, 8.2, 8.3, 8.4 and the fifth inverter connected to the second flat electrode 9. The potentials of the inverters 12 are modulated with a variable function, for example, a sine function, with the potentials of the inverters 12 associated with the electrode segments 8.1, 8.2, 8.3, 8.4 in phase and with the potential of the inverter 12 associated with the second flat electrode 9 phase shifted by 180° relative thereto. Thus, a time-varying, periodic potential difference is generated, with alternating relatively positive and relatively negative contributions, which corresponds to an AC voltage.

Figure 6:
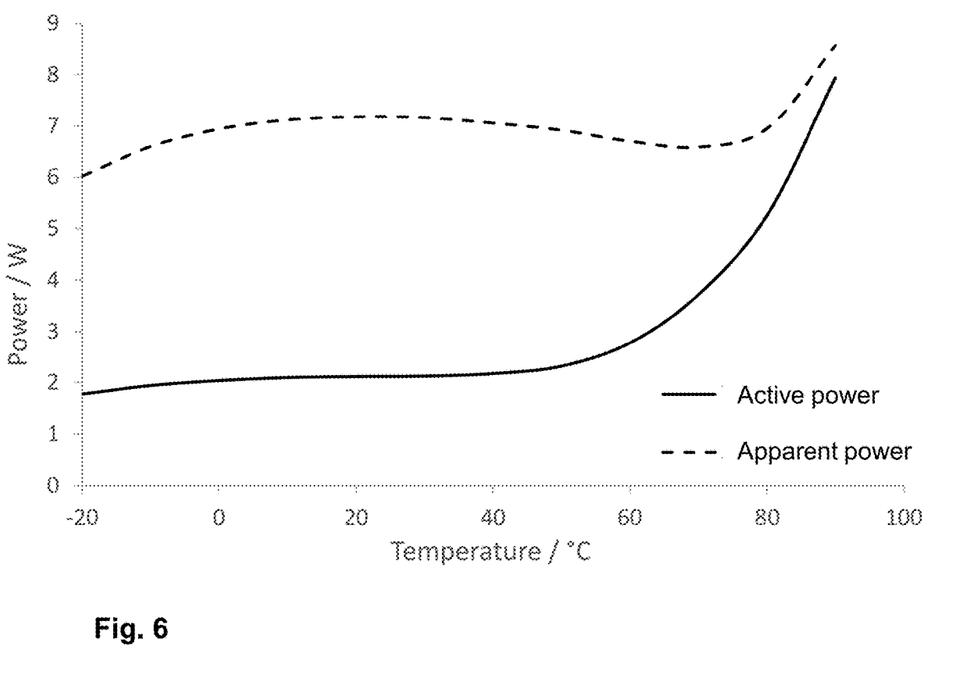

FIG. 6 depicts a diagram of the power consumption plotted against temperature for an exemplary PDLC functional element 4. Power consumption is used here as a measure of current draw. Both the apparent power (going back to the apparent current) and the effective power (going back to the effective current) are plotted. The apparent power is composed of active power and reactive power. It can be seen that the apparent power (or the apparent current) is not suitable for determining a temperature because its temperature-dependent curve does not correspond to a one-to-one function: the same power value (or current value) can occur at more than one temperature. In contrast, the effective power (or the effective current) is described by a one-to-one function. It can therefore be used to ascertain the temperature.

A measurement of the output current of the inverter 12 yields the apparent current (expressed here as apparent power). Such a measurement can also be used to determine the temperature if the reactive current is subsequently calculated out of the apparent current in order to ascertain the active current. However, it is more advantageous to measure the current draw of the inverter 12. This corresponds directly to the active current (expressed here as active power) after correction of the loss currents in the inverter which are assumed to be linear.

It is also discernible from the diagram that the current draw (expressed here as power consumption) and thus the impedance is strongly temperature-dependent only above a certain limit temperature of approx. 60° C., whereas the temperature-dependent change below the limit temperature is comparatively less pronounced. It is therefore conceivable that the method according to the invention is carried out such that the temperature is determined and, in the event that the temperature is lower than a previously specified limit temperature, a temperature-independent voltage is applied to the flat electrodes 8, 9, whereas, in the event that the temperature is higher than the limit temperature, a temperature-dependent voltage according to the invention is applied. The limit temperature can be, for example, 40° C., 50° C., or 60° C.

LIST OF REFERENCE CHARACTERS (S1, S2, S3, S4) independent switching regions of the glazing unit
(1) outer pane
(2) inner pane
(3) thermoplastic intermediate layer
(3a) first layer of the intermediate layer 3
(3b) second layer of the intermediate layer 3
(3c) third layer of the intermediate layer 3
(4) functional element with electrically controllable optical properties
(5) active layer of the functional element 4
(6) first carrier film of the functional element 4
(7) second carrier film of the functional element 4
(8) first flat electrode of the functional element 4
(8.1, 8.2, 8.3, 8.4) electrode segments of the first flat electrode 8
(8') insulation line between two electrode segments 8.1, 8.2, 8.3, 8.4
(9) second flat electrode of the functional element 4
(10) control unit
(11) DC/DC converter
(12) inverter
(13) masking print
(14) electric cables
(15) voltage source/DC voltage source
X-X' section line
Y enlarged region

The invention claimed is:

1. A glazing unit which has electrically controllable optical properties and multiple independent switching regions, comprising:
a composite pane, comprising
an outer pane and an inner pane that are joined to one another via a thermoplastic intermediate layer,
an electrically controllable functional element that is arranged between the outer pane and the inner pane and has an active layer that has electrically controllable optical properties between a first flat electrode and a second flat electrode, a control unit that is adapted to control the optical properties of the electrically controllable functional element, wherein the first flat electrode is divided by at least one insulation line into at least two separate electrode segments, wherein each electrode segment of the first flat electrode and the second flat electrode are electrically connected to the control unit such that an electric voltage is applicable between each electrode segment of the first flat electrode and the second flat electrode independently of one another in order to control the optical properties of the section of the active layer situated therebetween, wherein the second flat electrode has no insulation lines or has a smaller number of insulation lines and, consequently, has a smaller number of electrode segments than the first flat electrode such that at least one electrode segment of the second flat electrode is associated with multiple electrode segments of the first flat electrode, wherein the control unit is adapted to ascertain a temperature of the composite pane and applying an electric voltage, whose magnitude depends on the temperature of the composite pane, between the multiple electrode segments of the first flat electrode, on the one hand, and the second flat electrode, on the other.

2. The glazing unit according to claim 1, wherein the electrically controllable functional element is a PDLC functional element, an SPD functional element, or an electrochromic functional element.

3. The glazing unit according to claim 1, wherein the control unit
is connected to a DC voltage source and
is equipped with at least one inverter that is adapted to convert the DC voltage into an AC voltage, which is applied to the multiple electrode segments of the first flat electrode, on the one hand, and the second flat electrode, on the other.

4. The glazing unit according to claim 3, wherein the control unit
is connected to the DC voltage source,
is equipped with a DC/DC converter that is adapted to convert a primary voltage of the DC voltage source into a higher secondary voltage, and
is equipped with the at least one inverter that is adapted to convert the secondary voltage into the AC voltage which is applied to the multiple electrode segments of the first flat electrode, on the one hand, and the second flat electrode, on the other.

5. The glazing unit according to claim 1, wherein the composite pane is equipped with a temperature sensor that is connected to the control unit such that the control unit is adapted to ascertain the temperature of the composite pane by the temperature sensor.

6. The glazing unit according to claim 1, wherein the control unit is adapted to determine an impedance of the active layer and to ascertain the temperature of the composite pane therefrom.

7. The glazing unit according to claim 6, wherein the control unit
is connected to a DC voltage source and
is equipped with at least one inverter that is adapted to convert the DC voltage into an AC voltage, which is applied to the multiple electrode segments of the first flat electrode, on the one hand, and the second flat electrode, on the other, and
wherein the control unit is adapted to determine the impedance of the active layer from a measurement of the current draw of the inverter.

8. The glazing unit according to claim 1, wherein the at least one insulation line has a width of 5 µm to 500 µm.

9. A method comprising providing a glazing unit according to claim 1 as a window pane of a vehicle.

10. The method according to claim 9, wherein the window pane is a windshield or roof panel.

11. A method for controlling a glazing unit which has electrically controllable optical properties and multiple independent switching regions, wherein the glazing unit comprises
a composite pane, comprising
an outer pane and an inner pane that are joined to one another via a thermoplastic intermediate layer,
an electrically controllable functional element that is arranged between the outer pane and the inner pane and has an active layer which has electrically controllable optical properties between a first flat electrode and a second flat electrode, and
a control unit that is adapted to control the optical properties of the electrically controllable functional element, wherein the first flat electrode is divided by at least one insulation line into at least two separate electrode segments, wherein each electrode segment of the first flat electrode and the second flat electrode are electrically connected to the control unit such that an electric voltage is applicable between each electrode segment of the first flat electrode and the second flat electrode independently of one another in order to control the optical properties of the section of the active layer situated therebetween, wherein the second flat electrode has no insulation lines or a smaller number of insulation lines and, consequently, has a smaller number of electrode segments than the first flat electrode such that at least one electrode segment of the second flat electrode is associated with multiple electrode segments of the first flat electrode, the method comprising
(a) determining the temperature of the composite pane, and
(b) by means of the control unit, applying an electric voltage, whose magnitude depends on the temperature of the composite pane determined, between at least one electrode segment of the first flat electrode, on the one hand, and the second flat electrode, on the other.

12. The method according to claim 11, wherein the composite pane is equipped with a temperature sensor that is connected to the control unit and wherein the control unit determines the temperature of the composite pane by the temperature sensor.

13. The method according to claim 11, wherein the control unit determines the impedance of the active layer and determines the temperature of the composite pane therefrom.

14. The method according to claim 13, wherein the control unit is connected to a DC voltage source and is equipped with an inverter that converts the DC voltage into an AC voltage that is applied to the multiple electrode segments of the first flat electrode, on the one hand, and the second flat electrode, on the other,
and wherein the control unit determines the impedance of the active layer from a measurement of the current draw of the inverter.

15. The method according to claim 14, wherein the control unit is further equipped with a DC/DC converter that converts a primary voltage of the DC voltage source into a higher secondary voltage, wherein the inverter converts the secondary voltage into the AC voltage.

16. The method according to claim 11, wherein the control unit determines the magnitude of the voltage that is applied between the at least one electrode segment of the first flat electrode and the second flat electrode, as a function of the temperature and the switching state, using calibration data.

* * * * *

UNITED STATES PATENT AND TRADEMARK OFFICE
CERTIFICATE OF CORRECTION

| | | |
|---|---|---|
| PATENT NO. | : 12,466,167 B2 | Page 1 of 1 |
| APPLICATION NO. | : 18/263855 | |
| DATED | : November 11, 2025 | |
| INVENTOR(S) | : Richard Stelzer | |

It is certified that error appears in the above-identified patent and that said Letters Patent is hereby corrected as shown below:

On the Title Page

In Item (54) and in the Specification, Column 1, Lines 1-3, Title, should read:
GLAZING UNIT WHICH HAS ELECTRICALLY CONTROLLABLE OPTICAL PROPERTIES AND MULTIPLE INDEPENDENT SWITCHING REGIONS Signed and Sealed this
Third Day of February, 2026

John A. Squires
*Director of the United States Patent and Trademark Office*